Figure 7:
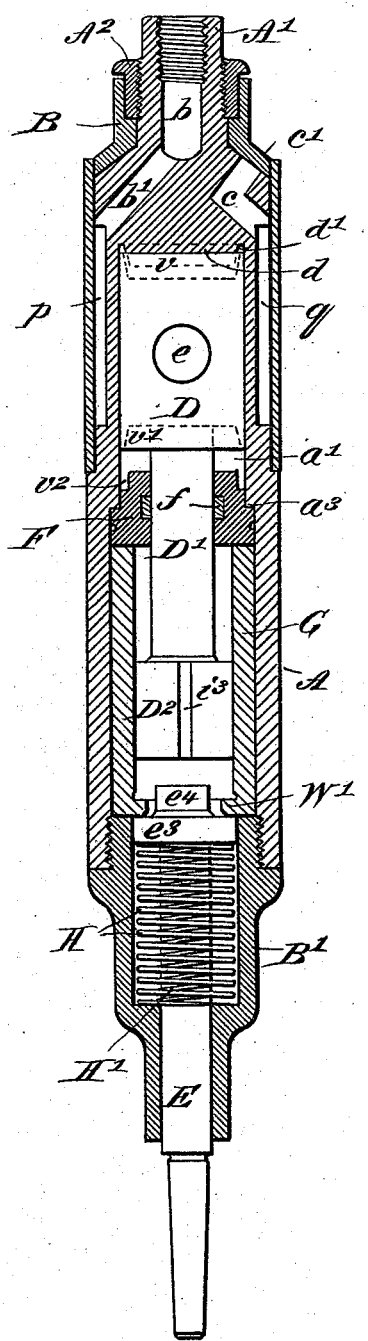

(No Model.) 2 Sheets—Sheet 1.
J. S. MacCOY, F. H. MARSH & G. H. WILLIAMS.
PNEUMATIC TOOL.
No. 412,517. Patented Oct. 8, 1889.
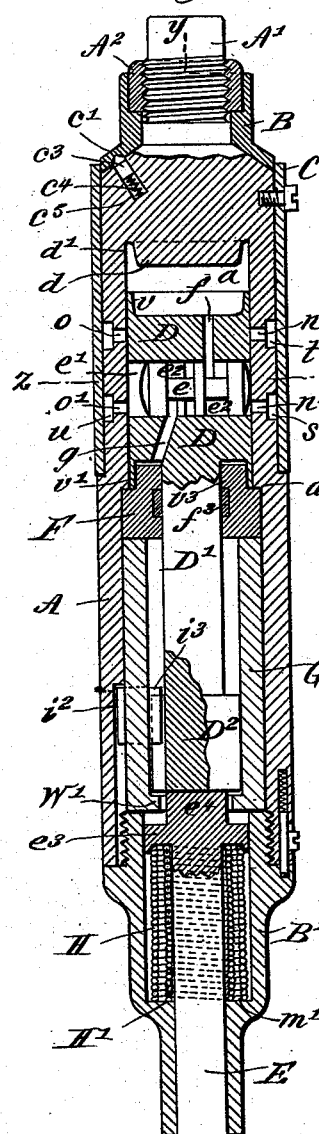
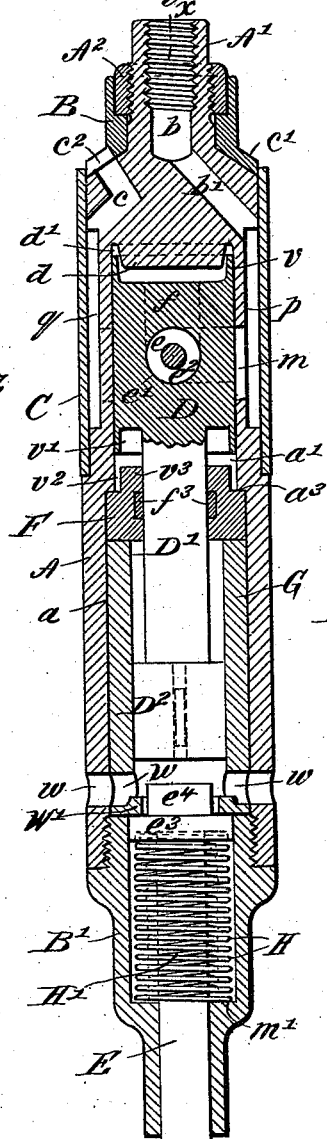
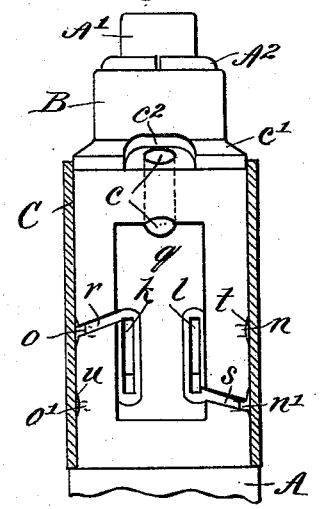
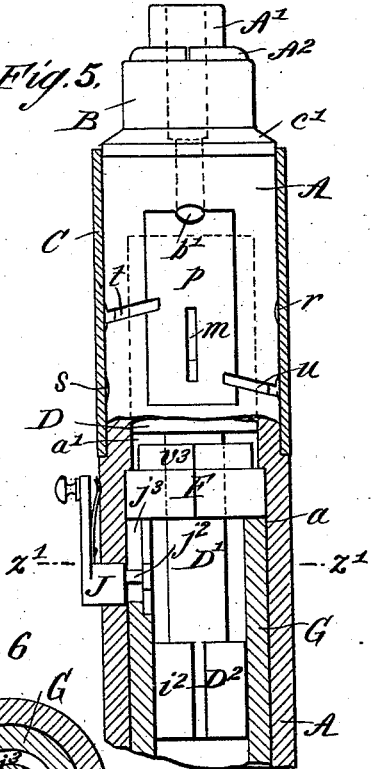
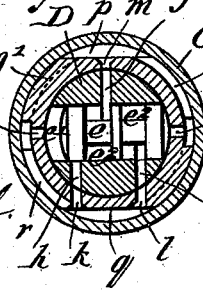
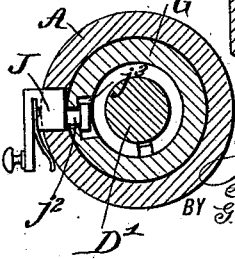
WITNESSES:
Donn Twitchell
C. Sedgwick
INVENTOR:
J. S. MacCoy
F. H. Marsh
G. H. Williams
BY Munn & Co.
ATTORNEYS.

(No Model.) 2 Sheets—Sheet 2.

J. S. MacCOY, F. H. MARSH & G. H. WILLIAMS.
PNEUMATIC TOOL.

No. 412,517. Patented Oct. 8, 1889.

WITNESSES:
Donn Twitchell
C. Sedgwick

INVENTOR:
J. S. MacCoy
F. H. Marsh
BY G. H. Williams
Munn & Co.
ATTORNEYS.

UNITED STATES PATENT OFFICE.

JAMES S. MacCOY, OF NEW YORK, N. Y., FRANK H. MARSH, OF NEWARK, NEW JERSEY, AND GEORGE H. WILLIAMS, OF NEW YORK, N. Y., ASSIGNORS TO THE AMERICAN PNEUMATIC TOOL COMPANY, OF NEW YORK.

PNEUMATIC TOOL.

SPECIFICATION forming part of Letters Patent No. 412,517, dated October 8, 1889.

Application filed January 3, 1889. Serial No. 295,288. (No model.)

*To all whom it may concern:*

Be it known that we, JAMES S. MACCOY, of the city, county, and State of New York, FRANK H. MARSH, of Newark, in the county of Essex and State of New Jersey, and GEORGE H. WILLIAMS, of the city, county, and State of New York, have invented a new and Improved Pneumatic Tool, of which the following is a full, clear, and exact description.

Our invention relates to certain improvements in that form of pneumatic tool shown and described in Letters Patent No. 323,053, July 28, 1885, and No. 326,312, September 15, 1885, the object being to improve the efficiency and durability of the tool.

Reference is to be had to the accompanying drawings, forming a part of this specification, in which similar letters of reference indicate corresponding parts in all the views.

Figure 1 is a longitudinal sectional elevation of the improved pneumatic tool, taken on line $x\,x$ of Fig. 2, the striker being shown in position of delivering its blow upon the spindle. Fig. 2 is a similar view on line $y\,y$ of Fig. 1. Fig. 3 is a sectional elevation of the upper end of the tool. Fig. 4 is a transverse sectional elevation on line $z\,z$ of Fig. 1. Fig. 5 is a broken and sectional elevation of the main portion of the tool, showing a side lever for throwing the tool out and in action. Fig. 6 is a transverse sectional plan view on the line $z'\,z'$ of Fig. 5, and Fig. 7 is a longitudinal section of the tool.

A is the main cylindrical casing made in the interior in two or more diameters, forming two chambers $a\,a'$. The lower end of said casing is screw-threaded to receive the hollow tip B', while its upper end is solid, except as bored to form the induction-port $b$ $b'$ and eduction-passage $c$. The portion $b$ of the induction-port is made in the small shank A', which is internally screw-threaded to couple with the compressed-air pipe. It is externally screw-threaded to receive the nut $A^2$, which holds the rotating valve B in place upon the end of the main casing. This valve is to open and close the exhaust-port $c$ to start and stop the action of the tool by a simple movement. The valve is formed with a flange $c'$, having a clearance-opening $c^2$ to uncover the port $c$, and it is held from turning too freely by a plug $c^3$, acted on by a coiled spring $c^4$, both held in socket $c^5$, as shown in Fig. 1. The top of the main casing is formed on the inside with a projection $d$, surrounded by an annular space $d'$, for the purposes hereinafter described. The said main casing has formed in it three slots $k\,l\,m$, (shown in Figs. 3 and 5,) and also four passages or ports $n\,n'$ and $o\,o'$, and upon its outer surface it is faced off on opposite sides, as shown at $p\,q$, Figs. 2, 3, and 5, and it is grooved, as shown at $r$, $s$, $t$, and $u$. Upon the outer surface of the upper portion of the main casing is fitted the jacket C, which covers all of the ports and passages in and through the main casing.

D is the piston, formed in one piece with the shank D', having the enlarged head $D^2$. The piston is provided with the transversely-arranged slide-valve $e$, and is formed with the air-passages $h$ and $i$, which coincide with the slots $k\,l$. It is also formed with the passage $j$, which coincides with the slot $m$; also, it is formed with vertical passages $f\,g$, leading, respectively, to the top and bottom of the piston from the chamber $e'$, in which the slide-valve $e$ is placed. The slide-valve is formed with grooves $e^2\,e^3$, so arranged that in its reciprocating movement, caused by pressure of air entering the ports $n\,o'$, it opens and closes at the proper time all of the air-passages in the piston.

In operation compressed air or steam being admitted through the induction-passage $g$ into passage $p$ (the striker being in the upper position, as in Fig. 2) passes through passage $t$ and port $n$, moving valve $e$ to close passage $i$ in the piston and to connect passages $m, j$, and $f$, whereby air is admitted above the piston D, and at the same time the passages $h$, $k$, and $g$ are connected to allow exhaust from below the piston through passage $q$ and exhaust-port $c^2$. Then the compressed air entering passage $u$ and port $o'$ moves valve $e$ to close passage $h$ and connect passages $m, j$, and $g$ to admit air below the piston, and to connect passages $f$, $i$, and $l$ to open the exhaust from above the piston, and so on alternately causing the piston to have a very rapid reciprocating motion, causing shank D' and head D² to deliver rapid and effective blows upon the inner end of the spindle E, held on the tip B. The upper end of the piston is chambered or cupped to shorten its longitudinal air-passages and to form the flange $v$ to fit in the groove $d'$, so that a cushion of air will be confined in said groove to prevent the piston from contact with the casing on the upstroke, and the said flange lengthens the exterior surface to prevent the bearing through or escape of air between the contact-surfaces of the piston and casing. The lower end of the piston is chambered or cupped to form a similar flange V' for a like purpose, and which strikes in a groove $v^2$ around the upper portion of the washer F, formed by the projection $v^3$ of the washer, so that a cushion of air will be confined in the groove to prevent the piston from striking the said washer on the downstroke. This cup also shortens the longitudinal passages of the piston while the same exterior length is maintained. The said washer F forms the lower end of the chamber $a'$, in which the piston operates, and it is a split washer made in two sections to adapt it to be placed on the shank D', which is of less diameter than the head D². The washer is provided with packing $f^3$, and is held firmly in place between the offset $a^3$ and the upper end of the tube G, placed in the lower chamber $a$ of the main casing.

The lower end of the tube G and main casing A are formed with corresponding apertures $w$ $w$ to permit free escape of air from below the head D² at the time it delivers blows upon the spindle E, so there will be no resistance of air between the said head and the inner end of the spindle E, and the lower end of the said tube G is formed with an inwardly-projecting flange $w'$, against which the flange $e^3$ of the spindle is held by the two coiled springs H H'. The head $e^4$ projects up into the tube G to receive the blow.

The springs H H' are coiled in opposite directions and rest upon the seat $m'$ and act between it and the flange $e^3$ of the spindle. By the use of two springs the jar is distributed, so that greater durability and more uniform action are secured.

The tube G and piston D are kept from rotating by splines $i^2$ $i^3$. (Shown in Fig. 1.)

In place of the valve B at the end of the tool for closing the exhaust we may use an eccentric J, fitted in the main casing A and attached to the tube G in slot $j^3$, so that by turning the lever the eccentric-pin $j^2$ will turn the tube G and the piston, and carry the passages $h$ $i$ $j$ in the piston out of line with the passages $k$ $l$ in the main casing, thus stopping the action of the tool.

The passage $g$ is made larger than the other passages, and is so formed relatively to the movement of the slide-valve that for induction it is only partly opened by the slide-valve, but for eduction it is fully opened. This produces a comparatively slow up movement of the piston, while the downstroke is of full force.

Having thus fully described my invention, I claim as new and desire to secure by Letters Patent—

1. The piston having a transverse slide-valve fitted therein and formed with passages $f$ $g$, leading from the valve-chamber to the upper and lower ends of the piston, respectively, the ends of the piston being capped to shorten the said passages $f$ $g$, and yet retain sufficient length of exterior surface to prevent escape or blowing through of air at the contact of the piston with the casing, substantially as described.

2. The main casing in one piece, containing tube G and washer F, in combination with the piston D, having shank D' and head D², substantially as described.

3. The main casing A and the tube G, fitted therein and having corresponding openings $w$, in combination with the washer F and piston having shank D' and head D², substantially as described.

4. The pneumatic tool herein shown and described, having a reciprocating piston and slide-valve carried by the piston, in combination with the rotating valve B, applied to the end of the main casing and formed with a flange $c'$, having an opening $c^2$ formed therein, substantially as and for the purposes set forth.

5. The main casing A and tube G, having flange $w'$, in combination with the spindle E, having flange $e^3$ and projection $e^4$, substantially as described.

6. The piston or striker formed with a slot, the casing having a corresponding slot, and the tube G, in combination with a spline fitted in the tube and entering both slots for aligning the ports of the striker with the ports of the main casing, substantially as described.

7. The piston or striker formed with a valve-chamber and with passages $h$ $i$ $j$ and vertical passages $f$ $g$, the latter being of greater area than the passage $f$, in combination with the slide-valve having the ring $e$, which partially closes the passage $g$ at induction and fully opens it for eduction, substantially as described.

JAMES S. MacCOY.
FRANK H. MARSH.
GEORGE H. WILLIAMS.

Witnesses:
W. E. PARK,
HENRY LE GENDRE.